(12) United States Patent
Takagi

(10) Patent No.: US 7,192,384 B2
(45) Date of Patent: Mar. 20, 2007

(54) AUTOMATIC TRANSMISSION CONTROL DEVICE

(75) Inventor: Akira Takagi, Obu (JP)

(73) Assignee: DENSO Corporation, Kariya (JP)

( * ) Notice: Subject to any disclaimer, the term of this patent is extended or adjusted under 35 U.S.C. 154(b) by 254 days.

(21) Appl. No.: 10/968,950

(22) Filed: Oct. 21, 2004

(65) Prior Publication Data

US 2005/0090353 A1   Apr. 28, 2005

(30) Foreign Application Priority Data

Oct. 24, 2003   (JP) .............................. 2003-364526

(51) Int. Cl.
*F16H 61/26* (2006.01)
*F16H 31/00* (2006.01)

(52) U.S. Cl. ...................... 477/158; 475/128

(58) Field of Classification Search ................ 475/119, 475/120, 127, 128; 477/125, 126, 98, 127, 477/130, 156, 158, 163; 701/58, 60
See application file for complete search history.

(56) References Cited

U.S. PATENT DOCUMENTS 5,921,888 A * 7/1999 Park ........................ 477/131
6,102,826 A * 8/2000 Takahashi et al. .......... 475/119
6,358,185 B1   3/2002 Bertsche et al.
6,464,610 B1 * 10/2002 Hisano et al. ............. 475/119
6,470,763 B2 * 10/2002 Ohashi et al. ............... 74/335
6,475,113 B2 * 11/2002 Suzuki et al. .............. 477/127

* cited by examiner

*Primary Examiner*—Roger Pang
(74) *Attorney, Agent, or Firm*—Nixon & Vanderhye P.C.

(57) ABSTRACT

An automatic transmission control device adjusts a hydraulic pressure of a working fluid to generate pressures applied to a plurality of friction elements of an automatic transmission to control the engagement or disengagement of the friction elements. The control device includes a plurality of electromagnetic valves, a plurality of application pressure control valves, a selector, and a line pressure control valve. The application pressure control valves control pressures applied to the friction elements according to the output pressures of the electromagnetic valves. The selector selects the maximum pressure from the output pressures of the electromagnetic valves. The line pressure control valve controls a line pressure according to the output pressure selected by the selector.

10 Claims, 2 Drawing Sheets

| RANGE | | L/C | 2-4/B | H/C | LR/B | R/C |
|---|---|---|---|---|---|---|
| | TRANSMISSION STEP | | | | | |
| D | 1st | ○ | | | (○) | |
| | 2nd | ○ | ○ | | | |
| | 3rd | ○ | | ○ | | |
| | 4th | | ○ | ○ | | |
| R | | | | | ○ | ○ |
| P,N | | | | | | |

AUTOMATIC TRANSMISSION CONTROL DEVICE

CROSS REFERENCE TO RELATED APPLICATIONS

This application is based upon and claims the benefit of priority of Japanese Patent Application No. 2003-364526, filed on Oct. 24, 2003, the contents of which are incorporated herein by reference.

FIELD OF THE INVENTION

The present invention relates to an automatic transmission control device that adjusts a hydraulic pressure of a working fluid to control the engagement or disengagement of a plurality of friction elements of an automatic transmission.

BACKGROUND OF THE INVENTION

In the conventional technology, either a control valve driven by a throttle cable or an electromagnetic valve is used to control a pressure in a hydraulic line to be applied to a plurality of friction elements of an automatic transmission. However, configuring the throttle cable between the control valve and a throttle pedal tends to be complicated. Alternatively, a specially designed electromagnetic valve is required, which is not desirable.

Japanese Patent Laid-Open No. 2003-517536 discloses a method for driving a line pressure control valve. The method includes an application pressure control valve controlling a pressure applied to a friction element according to the output pressure of an electromagnetic valve. This method can eliminate the need for a cable between the throttle pedal and the control valve and eliminate the need for a specially designed electromagnetic valve.

However, in the method disclosed in Japanese Patent Laid-Open No. 2003-517536, the pressure applied to the friction element changes according to a change in the output pressure of the electromagnetic valve. Furthermore, the line pressure changes according to the change in the applied pressure. Therefore, the time between initiating a change in the output pressure of the electromagnetic valve and initiating a change in the line pressure is elongated, thereby decreasing the responsivity of controlling the line pressure.

SUMMARY OF THE INVENTION

An object of the invention is to provide an automatic transmission control device to improve responsivity in controlling a line pressure.

Accordingly, a selector selects a maximum pressure from output pressures of at least two electromagnetic valves. A line pressure control valve controls a line pressure according to the selected output pressure. Furthermore, an application pressure control valve controls the line pressure control valve according to the selected output pressure. The application pressure control valve does not utilize a pressure applied to a friction element that the application pressure control valve controls according to the selected output pressure. Hence, the time between initiating a change in the output pressure of the electromagnetic valve and initiating a change in the line pressure can be shortened, thereby increasing the responsivity of controlling the line pressure.

In one embodiment, the application pressure control valve corresponding to the friction element to be engaged in a forward range is defined as a forward application pressure control valve. The electromagnetic valve for supplying an output pressure to the forward application pressure control valve is defined as a forward electromagnetic valve. Furthermore, the application pressure control valve corresponding to the friction element to be engaged in a backward range is defined as a backward application pressure control valve. The electromagnetic valve for supplying an output pressure to the backward application pressure control valve is defined as a backward electromagnetic valve.

According to another aspect of the present invention, the selector selects an output pressure of at least one forward electromagnetic valve and an output pressure of at least one backward electromagnetic valve. For this reason, in the forward range, a controller issues a forward command for making the output pressure of the backward electromagnetic valve higher than the output pressure of the forward electromagnetic valve. Furthermore, the line pressure can be changed according to the output pressure of the backward electromagnetic valve without affecting the application pressure control performed by the forward application pressure control valve according to the output pressure of the backward electromagnetic valve. Similarly, in the backward range, the controller issues a backward command for making the output pressure of the forward electromagnetic valve higher than the output pressure of the backward electromagnetic valve. Furthermore, the line pressure can be changed according to the output pressure of the forward electromagnetic valve without affecting the application pressure control performed by the backward application pressure control valve according to the output pressure of the backward electromagnetic valve.

According to another aspect of the present invention, a selector valve is connected to a line pressure passage that is connected to the line pressure control valve and receives the line pressure. A forward passage is connected to the forward application pressure control valve. A backward passage is connected to the backward application pressure control valve.

In the forward range, the selector valve makes the forward passage communicate with the line pressure passage and prevents the backward passage from communicating with the line pressure passage. At this time, the line pressure is supplied to the forward application pressure control valve and the forward application pressure control valve can generate an application pressure by using the line pressure as an initial pressure. Furthermore, line pressure is not supplied to the backward application pressure control valve, thereby preventing it from generating a sufficient application pressure. For this reason, the output pressure of the backward electromagnetic valve can be freely changed without causing unintentional engagement of the friction element.

Similarly, in the backward range, the selector valve makes the backward passage communicate with the line pressure passage and stops the forward passage from communicating with the line pressure passage. At this time, the line pressure is supplied to the backward application pressure control valve and the backward application pressure control valve can generate an application pressure by using the line pressure as an initial pressure. Furthermore, the line pressure is not supplied to the forward application pressure control valve, thereby preventing it from generating a sufficient application pressure. This enables the output pressure of the forward electromagnetic valve to be freely changed without causing unintentional engagement of the friction element.

According to yet another aspect of the present invention, the controller issues a forward command when the temperature of the working fluid is lower than a threshold in the forward range. As a result, the line pressure control valve generates a high line pressure according to the high output pressure of the backward electromagnetic valve. Similarly, the controller issues a backward command when the temperature of the working fluid is lower than a threshold in the backward range. As a result, the line pressure control valve generates a high line pressure according to the high output pressure of the forward electromagnetic valve. Hence, in both the forward range and the backward range, the application pressure control valve corresponding to the friction element to be engaged can quickly fill the working fluid, the viscosity of which increases as the temperature decreases, into the fluid chamber for driving the friction element.

It should be understood that the threshold in the forward range may or may not be equal to the threshold in the backward range.

DETAILED DESCRIPTION OF THE INVENTION

Hereafter, the preferred embodiments of the present invention will be described based on the drawings.

Figure 1:
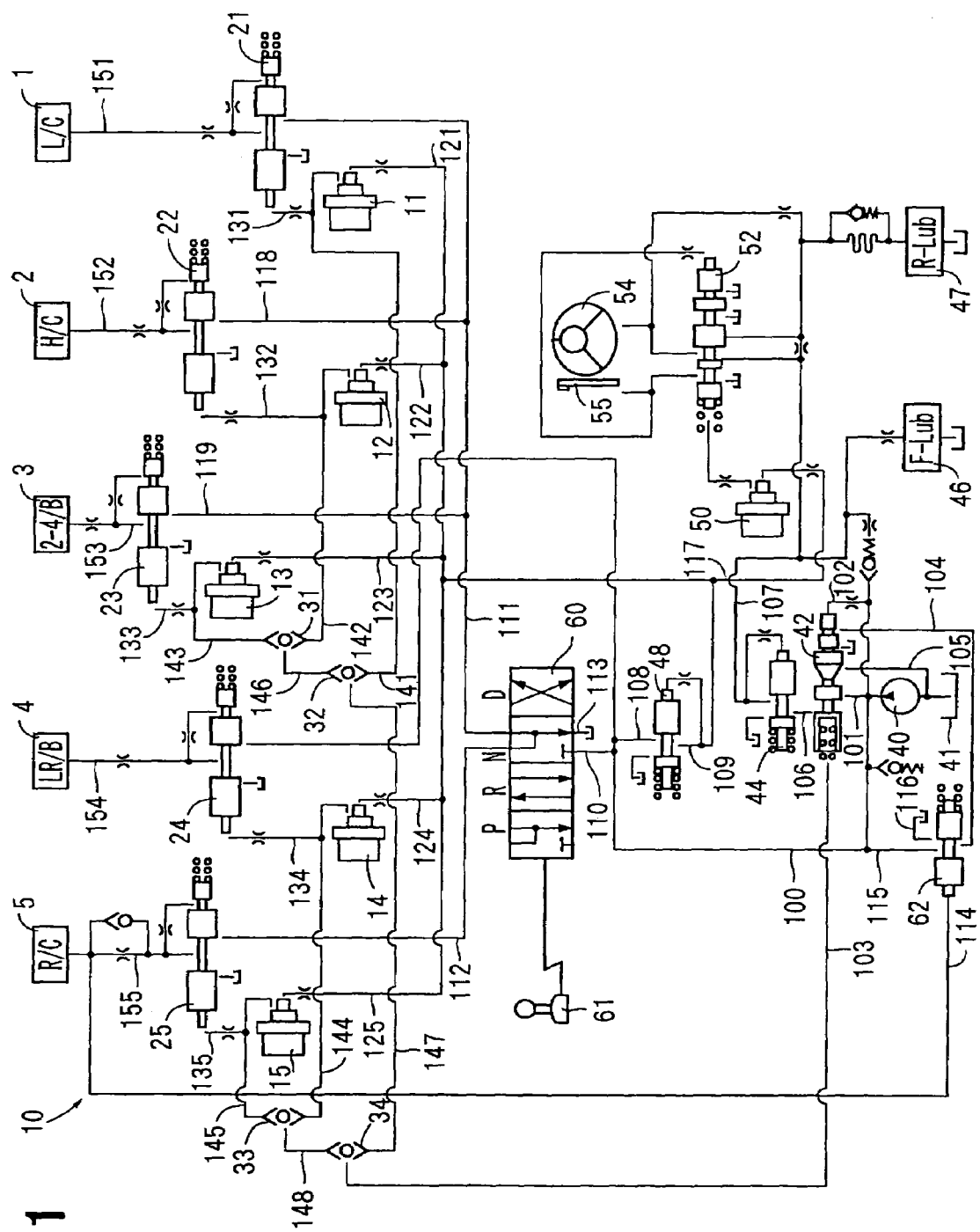
FIG. 1 is a schematic diagram of a hydraulic circuit for an automatic transmission control device in accordance with the principles of the present invention.
Figures 2, 3:
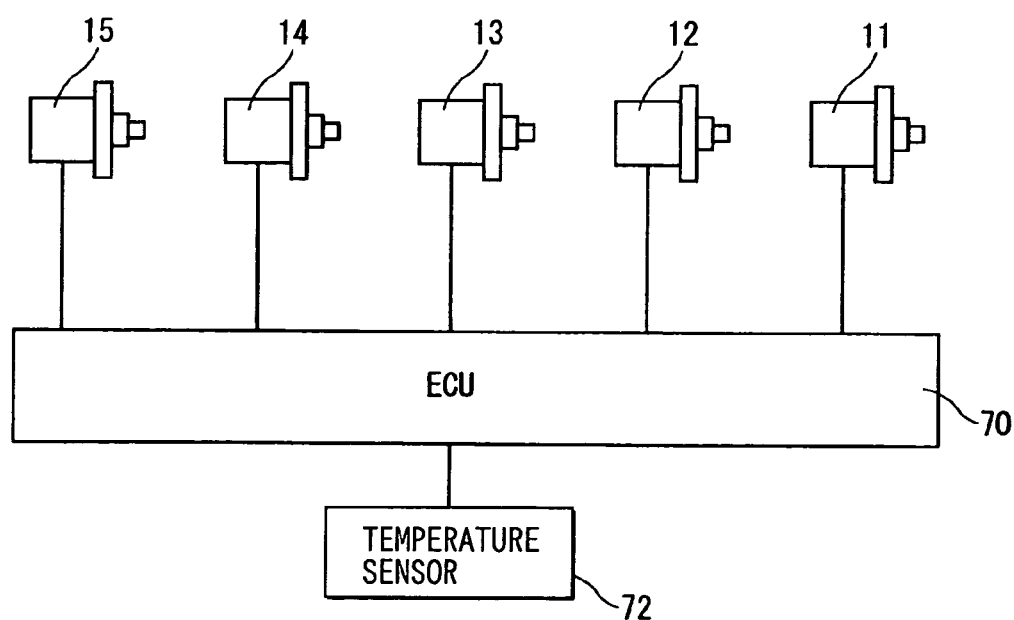
FIG. 2 is a table presenting various engagement configurations of an automatic transmission in accordance with the principles of the present invention.
FIG. 3 is a schematic diagram of an automatic transmission control device in accordance with the principles of the present invention.

FIG. 1 depicts a hydraulic circuit of an automatic transmission control device. FIG. 1 illustrates a plurality of friction elements of an automatic transmission including an under-drive clutch (L/C) 1, an over-drive clutch (H/C) 2, a 2-4 brake (2-4/B) 3, a low-reverse brake (LR/B) 4, and a reverse clutch (R/C) 5. An automatic transmission control device 10 adjusts the hydraulic pressure of a working fluid. The working fluid is adapted to be applied to the friction elements 1, 2, 3, 4, and 5. The friction elements 1, 2, 3, 4, and 5 are engaged or disengaged according to the pressure applied. Ranges of the automatic transmission include a drive (D) or forward range, a reverse (R) or backward range, a parking (P) range, and a neutral (N) range. The D range of the automatic transmission includes four gears. Changing between ranges and gears is accomplished by changing the combination of engagement and disengagement of the friction elements 1, 2, 3, 4, and 5. FIG. 2 provides a table showing which friction elements are engaged for the ranges and gears concerned. The circles indicate the friction elements that are engaged.

Referring back to FIG. 1, the automatic transmission control device 10 includes a hydraulic pump 40 that may be either mechanically or electrically driven. The hydraulic pump 40 discharges working fluid sucked from an oil pan 41 to a passage 100.

A primary valve 42, which serves as a line pressure control valve, is connected to passages 101, 102. Passages 101, 102 are branched from passage 100 and passages 103, 104. The primary valve 42 controls the pressure, which is a line pressure, of the working fluid in passage 100 that communicates with the passage 101 according to the hydraulic pressures in the passages 102, 103, and 104. To be specific, the primary valve 42 generates a line pressure proportional to a command pressure provided by passage 103, which will be described later. This causes the line pressure to increase as the command pressure increases. Hence, by utilizing the line pressure of passage 102, the primary valve 42 changes a proportionality factor of the line pressure to the command pressure of passage 103 when the hydraulic pressure in passage 104 is at the line pressure and when the hydraulic pressure in the passage 104 is lower than the line pressure, which will be described later.

The primary valve 42 is further connected to the oil pan 41, which is open to the atmosphere and a secondary valve 44 through passages 105, 106, respectively. There are cases where a portion of the working fluid introduced from the passage 101 is discharged to the oil pan 41 and the secondary valve 44. At this time, the secondary valve 44 utilizes the working oil discharged from the primary valve 42 to control the output pressure to a passage 107 communicating with lubrication circuits 46, 47.

A modulator valve 48 is connected to a passage 108 branched from passage 100 and a passage 109. The modulator valve 48 is a spool valve using the output pressure to the passage 109 as a feedback pressure and is constructed in such a way that the feedback pressure reduces the output pressure. With this, the modulator valve 48 reduces the line pressure supplied through passage 108 to generate a modulated output pressure not exceeding the line pressure.

A lockup electromagnetic valve 50 is connected to a passage 117 branched from passage 109 at the modulated pressure. The lockup electromagnetic valve 50 generates a command pressure by using the modulated pressure of passage 117 as an initial pressure. A lockup control valve 52 controls a hydraulic pressure applied to a lockup clutch 55 of a torque converter 54 according to the command pressure of the lockup electromagnetic valve 50 by using the hydraulic pressure of the passage 107 controlled by the secondary valve 44. The lockup clutch 55 engages or disengages an output shaft on an engine of a vehicle with or from an input shaft on an automatic transmission according to the hydraulic pressure applied by the lockup control valve 52.

A manual valve 60, which acts as a selector valve, is mechanically or electrically connected to a shift lever 61 of the vehicle and can be operated by a driver. The manual valve 60 is connected to a passage 110 branched from passage 100 of the line pressure, passages 111 and 112, and a passage 113 that is open to the atmosphere at a drain pressure. The manual valve 60 is constructed of a spool valve for switching passages 111, 112, respectively, to communicate with either passage 110 at the line pressure or passage 113 at the drain pressure. The driver moves a spool with the shift lever 61 to realize any one of the D, R, P, and N ranges. Specifically, in the D range, the manual valve 60 makes passage 111 communicate with passage 110, prevents passage 112 from communicating with passage 110, and makes passage 112 communicate with passage 113. This causes the line pressure to be supplied to passage 111 and the drain pressure to be supplied to passage 112. Furthermore, in the R range, the manual valve 60 makes passage 112 communicate with passage 110, prevents passage 111 from communicating with passage 110, and makes passage 111 communicate with passage 113. This causes the line pressure to be supplied to passage 112 and the drain pressure to be supplied to passage 111. Further yet, in the P or N range, the manual valve 60 makes passages 111 and 112 communicate with passage 113 causing the drain pressure to be supplied thereto.

A reverse shift valve 62 is connected to passages 104 and 114, a passage 115 branched from passage 100 at the line pressure, and a passage 116 that is open to the atmosphere at the drain pressure. The reverse shift valve 62 switches which of passages 104 and 116 communicate with passage 115 according to the hydraulic pressure in passage 114 to control the output pressure to passage 104. To be specific, the reverse shift valve 62 makes passage 115 communicate with passage 104 when the hydraulic pressure in passage 114 is lower than a predetermined threshold pressure. At this time, the line pressure in passage 115 is supplied through passage 104 and to the primary valve 42. On the other hand, the reverse shift valve 62 makes passage 115 communicate with passage 116 when the hydraulic pressure of passage 114 exceeds the threshold pressure. At this time, passage 115 does not communicate with passage 104 and the hydraulic pressure supplied through the passage 104 to the primary valve 42 becomes lower than the line pressure.

Electromagnetic valves 11, 12, 13, 14, and 15 are connected to passages 121, 122, 123, 124, and 125, respectively, which are branched from passage 109 at the modulated pressure. Furthermore, the electromagnetic valves 11, 12, 13, 14, and 15 are connected to passages 131, 132, 133, 134, and 135, respectively. Still further, the electromagnetic valves 11, 12, 13, 14, and 15 are electrically connected to an electronic control unit (ECU) 70 serving as a controller, as shown in FIG. 3. The electromagnetic valves 11, 12, 13, 14, and 15 generate output pressures to the passages 131, 132, 133, 134, and 135, respectively, by using the modulated pressure supplied from the passages 121, 122, 123, 124, and 125 according to a command signal outputted by the ECU 70. Here, the ECU 70 is electrically connected to a temperature sensor 72 (shown in FIG. 3) for detecting the temperature of the working fluid flowing through the hydraulic circuit of the automatic transmission control device 10 illustrated in FIG. 1. The ECU 70 generates command signals to each of the electromagnetic valves 11, 12, 13, 14, and 15 based on the detection results of the temperature sensor 72.

A plurality of pressure control valves 21, 22, 23, 24, and 25, shown in FIG. 1, acting as application pressure control valves, each include a spool valve. Pressure control valve 21 is connected to passage 111, to which the manual valve 60 supplies the line pressure or the drain pressure, passage 131, which corresponds to the electromagnetic valve 11, and a passage 151, which connects it to L/C 1. Pressure control valve 22 is connected to a passage 118, which is branched from passage 111, passage 132, which corresponds to the electromagnetic valve 12, and a passage 152, which connects it to H/C 2. Pressure control valve 23 is connected to a passage 119, which is branched from the passage 111, passage 133, which corresponds to the electromagnetic valve 13, and a passage 153, which connects it to 2-4/B 3. Pressure control valve 24 is connected to passage 100 at the line pressure, passage 134, which corresponds to the electromagnetic valve 14, and a passage 154, which connects it to LR/B 4. Pressure control valve 25 is connected to a passage 112, to which the line pressure or the drain pressure is applied by the manual valve 60, passage 135, which corresponds to the electromagnetic valve 15, passage 155, which connects it to R/C 5, and passage 114.

The pressure control valves 21, 22, 23, 24, and 25 control pressures applied to the friction elements 1, 2, 3, 4, and 5 according to the output pressures of the corresponding electromagnetic valves 11, 12, 13, 14, and 15 supplied through the passages 131, 132, 133, 134, and 135, respectively. To be specific, when the pressure control valves 21, 22, 23, 24, and 25 are supplied with the line pressures from passages 111, 118, 119, and 112, the pressure control valves 21, 22, 23, 24, and 25 generate application pressures proportional to the output pressures of the corresponding electromagnetic valves 11, 12, 13, 14, and 15 by using the line pressures as initial pressures. Here, when the hydraulic pressures of the passages 111, 118, 119, and 112 become the drain pressures, the pressure control valves 21, 22, 23, 24, and 25 make the application pressure equal to the drain pressures irrespective of the output pressures of the corresponding electromagnetic valves 11, 12, 13, 14, and 15. This is to prohibit the engagement of the corresponding friction elements 1, 2, 3, 4, and 5. The pressure control valve 24 generates an application pressure proportional to the output pressure of the corresponding electromagnetic valve 14 by using the line pressure supplied from the passage 100 as an initial pressure. The pressure control valves 21, 22, 23, 24, and 25 use the application pressures outputted to the passages 151, 152, 153, 154, and 155 as feedback pressures. The pressure control valves 21, 22, 23, 24, and 25 are constructed in such a way that the feedback pressures reduce the application pressures. With this, the pressure control valves 21, 22, 23, 24, and 25 limit the application pressures to a hydraulic pressure not exceeding the breakage limits of the corresponding friction elements 1, 2, 3, 4, and 5.

High-pressure selection valves 31, 32, 33, and 34 construct a selector in combination. High-pressure selection valve 31 is connected to a passage 142 branched from passage 132, a passage 143 branched from passage 133, and a passage 146. High-pressure selection valve 31 selects which of the passages 142 and 143 has a higher pressure and makes the selected passage communicate with passage 146.

High-pressure selection valve 32 is connected to a passage 141 branched from passage 131. Passage 146 receives the hydraulic pressure of passage 142 or 143, whichever is selected by the high-pressure selection valve 31, and a passage 147. High-pressure selection valve 32 selects which of passages 141 and 146 has a higher pressure and makes the selected passage communicate with passage 147. High-pressure selection valve 33 is connected to a passage 144 branched from passage 134, a passage 145 branched from passage 135, and a passage 148. High-pressure selection valve 33 selects which of passages 144 and 145 has a higher pressure and makes the selected passage communicate with passage 148.

High-pressure selection valve 34 is connected to passage 147, which receives hydraulic pressure from passage 141 or 146, whichever is selected by the high-pressure selection valve 32. High-pressure selection valve 34 is connected to passage 148, which receives hydraulic pressure from passage 144 or 145, whichever is selected by the high-pressure selection valve 33. Further yet, high-pressure selection valve 34 is connected to passage 103, which is connected to the primary valve 42. High-pressure selection valve 34 selects the high-pressure side of passages 147 and 148 and makes the selected passage communicate with passage 103. The high-pressure selection valves 31, 32, 33, and 34 select the maximum output pressure of the output pressures of the electromagnetic valve 11, 12, 13, 14, and 15 as a command pressure, which is then supplied to the primary valve 42 through passage 103.

Next, the distinctive action of the automatic transmission control device 10 will be described.

First, there will be described a case where the D range is selected by the driver.

When the fluid temperature T detected by the temperature sensor 72 is lower than a predetermined threshold $T_o$, the ECU 70 provides a command signal for realizing a desired transmission to the electromagnetic valves 11, 12, 13, 14, and 15. Furthermore, the ECU 70 provides a command signal for making the output pressure of the electromagnetic valve 15 higher than the maximum pressure of the output pressures of the electromagnetic valves 11, 12, 13, and 14, which is required to realize transmission to the electromagnetic valve 15. With this, the high output pressure of the electromagnetic valve 15 is supplied to the primary valve 42, whereby the line pressure is controlled to be equal to the high pressure. The pressure control valves 21, 22, 23, and 24 control the pressures applied to the corresponding friction elements 1, 2, 3, and 4 according to the output pressures of the corresponding electromagnetic valves 11, 12, 13, and 14, thereby realizing the desired transmission. At this time, the pressures applied are proportional to the line pressure controlled to the high pressure. Therefore, even when the fluid temperature T becomes equal to or less than the threshold temperature $T_o$, the viscosity of the working fluid decreases and hydraulic chambers for driving the friction elements 1, 2, 3, and 4 are quickly filled.

Furthermore, the pressure control valve 25 supplied with the drain pressure by the action of the manual valve 60 makes the pressure applied to the corresponding friction element 5 equal to the drain pressure. For this reason, even when the output pressure of the electromagnetic valve 15 becomes high, unintentional engagement of friction element 5 is avoided.

Next, there will be described a case where the R range is selected by the driver.

When the fluid temperature T detected by the temperature sensor 72 is lower than the threshold $T_o$, the ECU 70 provides a command signal for engaging the friction elements 4, 5 to the electromagnetic valves 14, 15. At the same time, the ECU 70 provides a command signal for making the output pressure of electromagnetic valve 13 higher than the maximum pressure of the output of the electromagnetic valves 14, 15 that is required to engage friction elements 4, 5. Furthermore, the ECU 70 provides a command signal for making the output pressures of electromagnetic valves 11, 12 equal to the drain pressure. With this, the high output pressure of electromagnetic valve 13 is supplied to the primary valve 42 and the line pressure is controlled to be equal to the high pressure. The pressure control valves 24 and 25, which are supplied with the line pressure by the action of the manual valve 60, control the pressures applied to the corresponding friction elements 4, 5 according to the output pressures of the corresponding electromagnetic valves 14, 15 to realize the engagement of the friction elements 4, 5. At this time, the pressures applied are proportional to the line pressure controlled to the high pressure and become high pressures. For this reason, even when the fluid temperature T becomes equal to or less than the threshold $T_o$, the viscosity of the working oil decreases and hydraulic chambers for driving the friction elements 4, are quickly filled.

Furthermore, the pressure control valve 23, which is supplied with the drain pressure by the action of the manual valve 60, makes the pressure applied to the corresponding friction element 3 equal to the drain pressure. For this reason, even when the output pressure of the electromagnetic valve 13 becomes high, unintentional engagement of the friction element 3 is prevented. Similarly, since the pressure control valves 21, 22, which are supplied with the drain pressure by the action of the manual valve 60, make the pressures applied to the friction elements 1, 2 equal to the drain pressure, unintentional engagement of friction elements 1, 2 is prevented.

On the other hand, when the oil temperature T detected by the temperature sensor 72 is higher than the threshold $T_o$, the ECU 70 provides a command signal to electromagnetic valves 14, 15 for engaging the friction elements 4, 5. Additionally, the ECU 70 provides a command signal to the electromagnetic valves 11, 12, and 13 for making the output pressures of the electromagnetic valves 11, 12 and 13 equal to the drain pressure. With this, the maximum output pressure of the output pressures of electromagnetic valves 14, 15 is supplied to the primary valve 42 and the line pressure is changed according to the supplied output pressure. For this reason, the pressure control valves 24, 25 receiving the increased output pressure increase the line pressure. Furthermore, increasing the output pressure of either electromagnetic valve 14 or 15 controls the pressures applied to the corresponding friction elements 4, 5 to be high. Hence, the above operating configurations ensure that the pressures applied to friction elements 4, 5, are higher in the R range when the fluid temperature T is higher than the threshold $T_0$. Furthermore, the pressure control valves 21, 22, and 23, make the pressures applied to the corresponding friction elements 1, 2, and 3 equal to the drain pressure when the fluid temperature T is higher than the threshold $T_0$. This prevents unintentional engagement of friction elements 1, 2, and 3.

In this manner, passages 101, 100, and 110, which are connected to the primary valve 42 as well as the manual valve 60, define a line pressure passage. Furthermore, passages 111, 118, and 119, which are connected to the pressure control valves 21, 22, and 23 as well as the manual valve 60, define a forward passage. Still further, in this embodiment, the passage 112, which is connected to pressure control valve 25 as well as the manual valve 60, defines a backward passage.

According to the automatic transmission control device 10 described above, the primary valve 42 can be directly driven by the output pressures of the electromagnetic valves 15, 13 when the oil temperature T is lower than the threshold $T_0$ in either the D or R range. Hence, the time between when the ECU 70 initiates a change in the output pressures of the electromagnetic valves 15, 13 and a change in the line pressure can be shortened, thereby increasing responsivity. In one embodiment, the threshold $T_0$ is 10° C.

It should be appreciated that while the D range is described as the forward range in the above embodiment, an alternative embodiment may adopt the low range (L range) or 2nd shift range (2 range) as the forward range in addition to the D range.

Furthermore, while the threshold of the fluid temperature T is set at the same $T_0$ for the D range and the R range in the above embodiment, it is also envisioned that different thresholds may be set for the D range and the R range.

Still further, in the above embodiment, when the fluid temperature T is lower than the threshold $T_o$ in the R range, the ECU 70 issues a command signal for making the output pressure of the electromagnetic valve 13 higher than the maximum pressure of the output pressures of electromagnetic valves 14, 15. Additionally, the ECU 70 issues a command signal for making the output pressures of electromagnetic valves 11, 12 equal to the drain pressure. In one alternative embodiment, it is envisioned that when the oil temperature T is lower than the threshold $T_0$ in the R range, the ECU 70 may issue a command signal for making the output pressure of electromagnetic valve 11 higher than the maximum pressure of the output pressures of electromagnetic valves 14, 15. Additionally, it is envisioned that the ECU may issue a command signal for making the output pressures of the electromagnetic valves 12, 13 equal to the drain pressure. In another alternative embodiment, it is envisioned that when the oil temperature T is lower than the threshold $T_0$ in the R range, the ECU 70 may issue a command signal for making the output pressure of the electromagnetic valve 12 higher than the maximum pressure of the output pressures of the electromagnetic valves 14, 15. Additionally, it is envisioned that the ECU 70 would issue a command signal for making the output pressures of electromagnetic valves 11, 13 equal to the drain pressure.

What is claimed is:

1. An automatic transmission control device for selectively engaging at least one of a plurality of friction elements of an automatic transmission by controlling an application pressure applied to each of the at least one of the plurality of friction elements, the device comprising:
    a plurality of electromagnetic valves, each of which provides an output pressure;
    a plurality of application pressure control valves, each of which controls the application pressure applied to a corresponding one of the plurality of friction elements according to a line pressure and a corresponding output pressure provided by a corresponding one of the plurality of electromagnetic valves;
    a selector for selecting a maximum pressure, which is one output pressure provided by one of the plurality of electromagnetic valves, and which is larger than an other output pressure provided by an other one of the plurality of electromagnetic valves; and
    a line pressure control valve that controls the line pressure according to the maximum pressure.

2. The control device of claim 1, wherein a forward electromagnetic valve selected from the plurality of electromagnetic valves supplies an output pressure to a corresponding first application pressure control valve to engage a first friction element and establish a forward range and a backward electromagnetic valve selected from the plurality of electromagnetic valves supplies an output pressure to a corresponding second application pressure control valve to engage a second friction element and establish a backward range.

3. An automatic transmission control device for adjusting a pressure of a working fluid to selectively engage at least one of a plurality of friction elements of an automatic transmission, the device comprising:
    a plurality of electromagnetic valves adapted to provide a plurality of output pressures;
    a plurality of application pressure control valves for controlling a plurality of application pressures applied to the plurality of friction elements according to the plurality of output pressures of the electromagnetic valves;
    a selector for selecting a maximum pressure from the plurality of output pressures of at least two of the plurality of electromagnetic valves; and
    a line pressure control valve for controlling a line pressure according to the maximum pressure;
    wherein a forward electromagnetic valve selected from the plurality of electromagnetic valves supplies an output pressure to a corresponding first application pressure control valve to engage a first friction element and establish a forward range and a backward electromagnetic valve selected from the plurality of electromagnetic valves supplies an output pressure to a corresponding second application pressure control valve to engage a second friction element and establish a backward range.

4. The control device of claim 3, further comprising a controller that issues a first command to the forward electromagnetic valve and a second command to the backward electromagnetic valve,
    the first command for making the output pressure of the backward electromagnetic valve higher than the output pressure of the forward electromagnetic valve in the forward range,
    the second command for making the output pressure of the forward electromagnetic valve higher than the output pressure of the backward electromagnetic valve in the backward range, and
    wherein the selector selects the output pressure of at least one of the forward and backward electromagnetic valves as the maximum pressure.

5. The control device of claim 3, further comprising:
    a line pressure passage communicating with the line pressure control valve and receiving the line pressure;
    a forward passage communicating with the first application pressure control valve;
    a backward passage communicating with the second application pressure control valve; and
    a selector valve communicating with the forward passage, the backward passage, and the line pressure passage,
    the selector valve being operable to substantially simultaneously make the forward passage communicate with the line pressure passage and prevent the backward passage from communicating with the line pressure passage in the forward range and substantially simultaneously make the backward passage communicate with the line pressure passage and prevent the forward passage from communicating with the line pressure passage in the backward range.

6. The control device of claim 4;
    wherein the line pressure control valve generates a higher line pressure as the maximum pressure increases, and
    wherein the controller issues the first command when a temperature of the working fluid is lower than a first threshold in the forward range and the second command when the temperature of the working fluid is lower than a second threshold in the backward range.

7. The control device of claim 6, wherein the first threshold is equal to the second threshold.

8. The control device of claim 5;
    wherein the line pressure control valve generates a higher line pressure as the maximum pressure increases, and
    wherein the controller issues the first command when a temperature of the working fluid is lower than a first threshold in the forward range and the second command when the temperature of the working fluid is lower than a second threshold in the backward range.

9. The control device of claim 8, wherein the first threshold is equal to the second threshold.

10. A method for selectively engaging at least one of a plurality of friction elements of an automatic transmission by controlling a plurality of application pressures, each of which is applied to a corresponding one of the at least one of the plurality of friction elements, the method comprising:
    providing a plurality of output pressures, each of which corresponds to a corresponding one of the plurality of friction elements;
    controlling the plurality of application pressures, each of which is applied to a corresponding one of the plurality of friction elements according to a line pressure and corresponding one of the plurality of output pressures;
    selecting a maximum pressure, which is one output pressure provided by the providing of the plurality of output pressures, and which is larger than an other output pressure provided by the providing of the plurality of output pressures; and
    controlling the line pressure according to the maximum pressure.

* * * * *